United States Patent [19]

Oosterling et al.

[11] 4,126,989
[45] Nov. 28, 1978

[54] MOWING IMPLEMENT

[75] Inventors: Pieter A. Oosterling; Hendricus C. van Staveren, both of Nieuw-Vennep, Netherlands

[73] Assignee: Multinorm B.V., Nieuw-Vennep, Netherlands

[21] Appl. No.: 856,590

[22] Filed: Dec. 1, 1977

Related U.S. Application Data

[63] Continuation of Ser. No. 794,188, May 3, 1977, which is a continuation of Ser. No. 733,064, Oct. 18, 1976, abandoned, which is a continuation of Ser. No. 579,551, May 21, 1975, abandoned.

[30] Foreign Application Priority Data

May 31, 1974 [NL] Netherlands .......................... 7407454

[51] Int. Cl.² ............................................. A01D 55/18
[52] U.S. Cl. ........................................ 56/295; 56/11.9; 56/6; 56/192
[58] Field of Search .................... 56/295, 192, 11.9, 6, 56/12.3

[56] References Cited

U.S. PATENT DOCUMENTS

| 2,976,663 | 3/1961 | Smith et al. | 56/10.7 |
| 3,017,732 | 1/1962 | Keyes | 56/11.9 |
| 3,469,378 | 9/1969 | Heesters et al. | 56/11.9 |
| 3,507,102 | 4/1970 | Kline et al. | 56/12.3 |
| 3,524,306 | 8/1970 | Reber | 56/12.3 |
| 3,774,380 | 11/1973 | Ancellin | 56/11.9 |

FOREIGN PATENT DOCUMENTS 1,195,688  6/1970  United Kingdom ..................... 56/11.9

Primary Examiner—Russell R. Kinsey
Attorney, Agent, or Firm—John P. Snyder

[57] ABSTRACT

A mowing implement comprises a number of rotating cutter members which are arranged next to each other and above a housing and which are slip-free coupled with each other by means of a driving gear arranged inside said housing, while said cutter members are driven by at least one motor arranged beneath a cutter support of a cutter member. Said motor communicates through a set of ducts with the driving member, for example an electrical aggregate or a hydraulical pump, said driving member being arranged on a vehicle and operating as an aggregate for producing energy.

8 Claims, 7 Drawing Figures

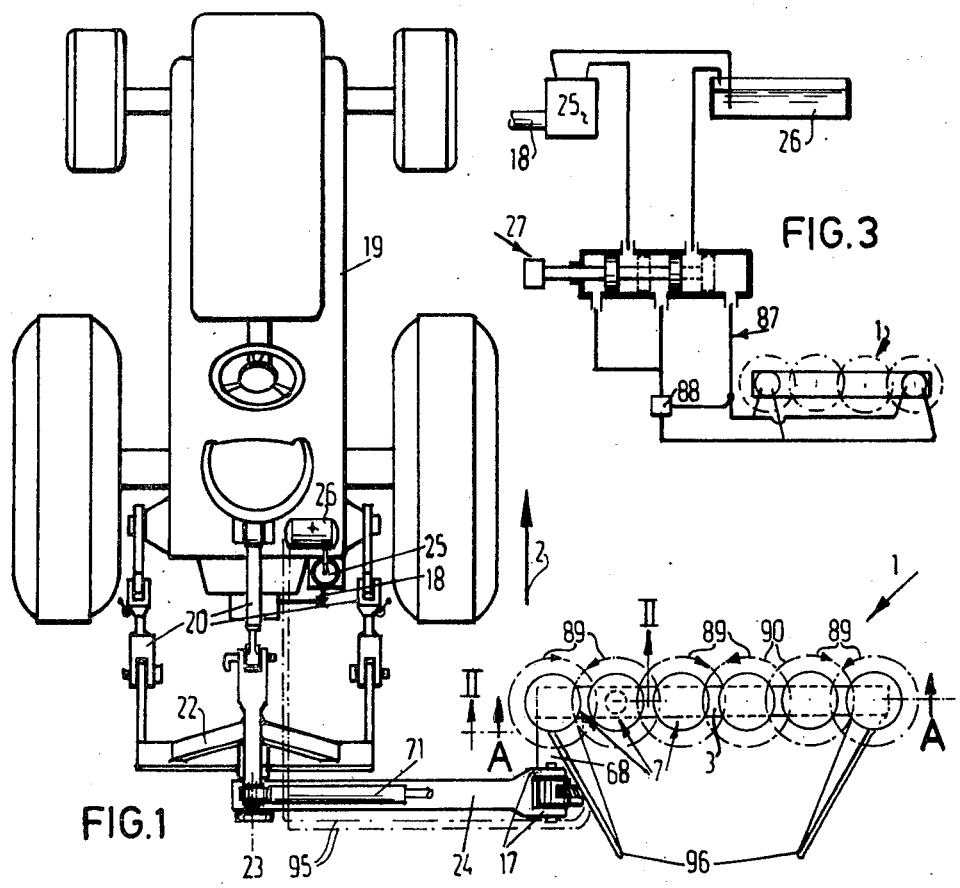
FIG.3
FIG.1
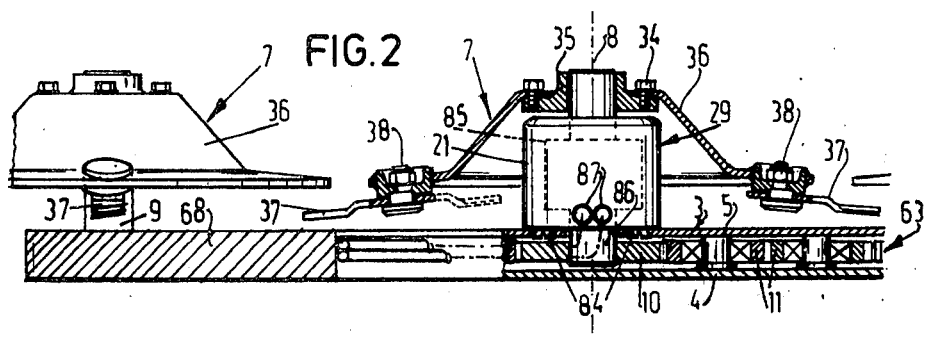
FIG.2

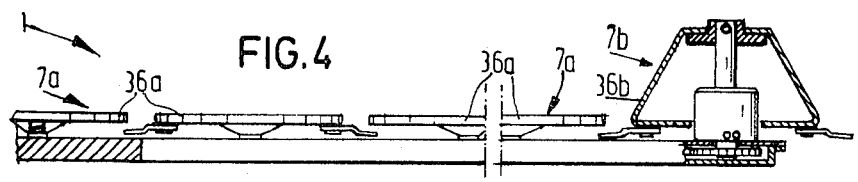
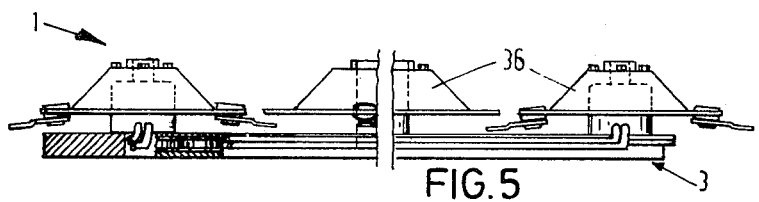
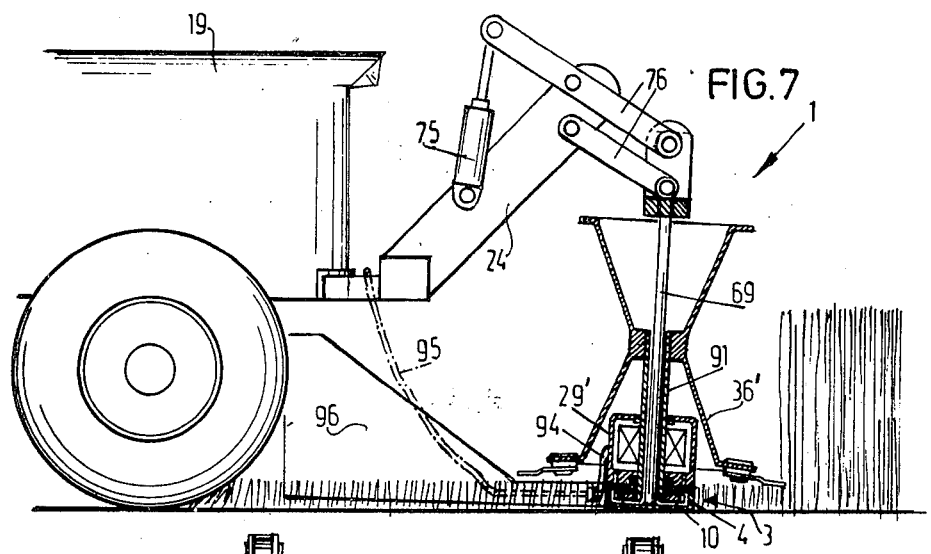
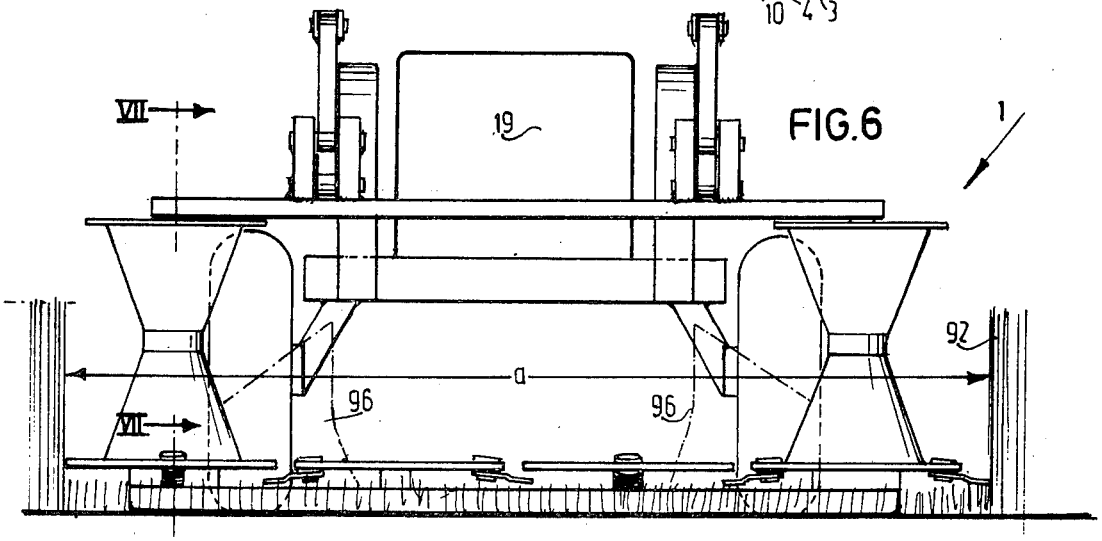

MOWING IMPLEMENT

This is a continuation of application Ser. No. 794,188, filed May 3, 1977 which is a rule 60 continuation of 733,064 filed Oct. 18, 1976 and now abandoned, which is a rule 60 continuation of parent application Ser. No. 579,551, filed May 21, 1975, and now abandoned.

The invention relates to a mowing implement to be attached to a vehicle, comprising a housing extending substantially at right angles to the direction of travel of the vehicle, at least one set of two cutter members rotatably journalled on said housing and arranged above said housing and adapted to rotate in opposite directions and a driving gear arranged inside said housing and driven via coupling means from a driving member actuated by the vehicle and establishing a slip-free coupling between the cutter members, each of which members comprises a cutter support and at least one cutter fastened to the periphery of the cutter support, whilst the cutters of the two cutter members are arranged in a relatively off-set fashion and the cutter paths of the two cutter members overlap one another.

Such a mowing implement is known. The coupling means between the driving gear inside the housing and a power take-off shaft of a tractor comprise a mechanical coupling driving gear, for example, a bevel gear wheel transmission arranged at the end of the housing at the side of the mowing zone and a universal shaft and a rope transmission arranged between the bevel gear wheel transmission and the power take-off shaft on a movable frame. This mowing device has the disadvantage that the end of the housing in the area of the bevel gear wheel transmission extends beyond the mowing zone so that this end moves along the ground without mowing effect. Consequently, it is necessary to free a strip of the field before the mowing device can run across with said end without being hindered. If a first run on a field of long crop has to be mown, the end of the housing presses down the standing crop and this crop lifts the mowing device out of the mowing level to an undesirable higher level.

The invention has for its object to avoid the aforesaid disadvantages. For this purpose in the mowing implement according to the invention a motor is arranged beneath the cutter support of at least one of the cutter members, said motor communicating through a set of ducts with the driving member arranged on the vehicle and operating as an aggregate for producing energy. The motor may be hydraulic, pneumatic or electric. Only one or each of the two cutter members may be provided with a motor beneath its cutter support. I more than one set of cutter members is provided, only one or each set of cutter members may have its own motor.

It should be noted that a mowing implement is known in which a motor is arranged beneath the cutter support of each cutter member. The cutter members are not intercoupled so that they do not rotate synchronously and the cutter paths cannot overlap one another.

The aforesaid and further features of the invention will become apparent from the following description of preferred embodiments of a mowing implement embodying the invention.

In the drawing:

FIG. 1 is a plan view of a tractor provided with a mowing implement according to the invention, FIG. 2 shows on an enlarged scale a sectional view taken on the line II—II in FIG. 1, FIG. 3 shows schematically coupling means of the implement in accordance with the invention, FIGS. 4 and 5 are enlarged sectional views taken on the line A—A on FIG. 1 showing different embodiments of the mowing implement in accordance with the invention, FIG. 6 is a front view of a further embodiment of the mowing implement in accordance with the invention and FIG. 7 is a sectional view taken on the line VII—VII in FIG. 6.

The mowing implement 1 shown in FIG. 1 is attached to a frame 22, suspended to the lifting bars 20 of a tractor 19. An auxiliary frame 24 is adapted to pivot about a horizontal axis 23 with respect to the frame 22. The other end of the auxiliary frame 24 is pivoted by means of a horizontal hinge 17 to a foot 68, which is rigidly secured to a housing 3 and which is adjustable by means of a hydraulic cylinder 71, arranged between the frame 22 and the foot 68 in order to adapt the mowing implement 1 to the slope of the ground level.

The mowing implement 1 according to the invention comprises a housing 3, extending substantially at right angles to the direction of travel 2 of the tractor 19 and having the shape of a flat, elongated beam essentially comprising a trough 4 and a lid 5 secured thereto. On the housing 3 an even number — for example six — of cutter members 7 are arranged so as to be rotatable about upright axes 8. The mowing members 7 are arranged near and above the housing 3 and are adapted to rotate pairwise in opposite directions. Each cutter member 7 is rigidly fastened by means of a shaft 9 to a gear wheel 10 of a driving gear means 63 arranged inside the housing 3 and formed by a sequence of gears, that is to say one or more gear wheels 10 serving as driving members and gears 11. Each gear wheel 10 is driven by a motor 29, arranged beneath a hood-shaped cutter support 36 of a cutter member 7, said motor communicating through a duct system 87 with the driving member arranged on the tractor 19 and producing energy like an aggregate, said driving member being formed by a pump 25, if the motor 29 is a hydraulic one, as is preferred. The pump 25 is driven by a shaft 18 of the tractor 19. The pump 25 displaces fluid from a sump 26 through the duct system 87 including a switching slide 27 to be actuated by the operator and one or more motors 29 back to the sump. When the mowing implement 1 strikes an obstacle or is overloaded in some way or other, the pressure in the duct system 87 exceeds a predetermined value fixed by an overload valve 88, the latter opens and the fluid flows directly back into the sump 26 so that each motor 29 is short-circuited.

The motor housing 21 is fastened to the housing 3 beneath a hood-like cutter support 36 of a cutter member 7 by means of screws 84 and the rotor 85 of the motor 29 is rigidly coupled through a lower output shaft 86 with a gear 10 of the driving gear means 63 and through an upper output shaft with a cutter support 36.

Between each pair of cutter members 7, rotating in opposite directions, an even number of gears, for example four, are arranged so that they rotate in opposite directions indicated by the arrows 89 and are slip-free coupled with one another.

Each cutter member 7 comprises a hood-like cutter support 36, fastened by means of a screw 34 to a hub 35, to which support are secured one or more cutters 37, for example two. The cutters 37 brush past beneath adjacent cutter supports 36, however, without touching the same (see FIG. 2). The cutters 37 of adjacent cutter members 7 are at an angle of 90° to one another so that they cannot touch one another, although the cutter paths 90 overlap one another. Each cutter 37 is freely rotatable about a pin 38, which is secured to the support 36. FIG. 2 shows by broken lines a cutter 37, which turns around with respect to the cutter support 36 when striking a stone, however, without touching any part of the motor housing 21, the housing 3 of the cutter support 36.

As is shown in FIG. 3 a motor 29 is arranged beneath one or, as is shown in FIG. 4, preferably beneath each of the outermost cutter members 7b. These cutter members 7b with their hood-like cutter supports 36b then serve as swath separators, whereas the intermediate cutter members 7a have a considerably lower and flatter cutter support 36a, which can readily pass beneath the cut crop.

The mowing implement 1 shown in FIGS. 6 and 7 is identical to that shown in FIGS. 1 to 5, but FIGS. 6 and 7 show the mowing implement 1 attached to the front side of the tractor 19 or another vehicle, whilst the housing 3 is fastened at each end to a substantially vertical supporting bars 69. The supporting bars 69 are suspended from an auxiliary frame 24 by means of parallel bars 76 and lifting cylinders 75. The lower end of each supporting bar 69 is welded to the trough 4 of the housing 3 and extends through a hollow shaft 91 of a motor 29', the top end of which shaft is rigidly secured to a drum-shaped cutter support 36' and the lower end is rigidly coupled with a gear wheel 10. FIG. 6 illustrates that a strip of a width a can be mown on a field of long crop 92 without stationary parts of the mowing implement 1 being dragged across the long crop 92. The duct system 87 comprises rigid ducts 94 connected with the housing 3 and hoses 95 between the tractor 19 and the mowing implement 1. The swath-separating effect of the hood-like cutter supports 36 may be further assisted by swath boards 96 connected with the housing 3.

Instead of being hydraulic the coupling means 6 may, though not preferably, be pneumatic or electric, in which cases an air compressor or a generator respectively are driven by a shaft of the tractor 19.

By means of the driving gear means 63 the cutter members 7, driven by only one or more separate motors 29, are coupled with one another so that they rotate pairwise in synchronism in opposite directions.

What we claim is:

1. A mowing implement to be attached to a vehicle, comprising a housing extending substantially at right angles to the direction of travel of the vehicle, at least one set of two cutter members rotatably journalled on said housing and arranged above said housing and adapted to rotate in opposite directions and a driving gear means arranged inside the housing and driven via coupling means from a driving means actuated by the vehicle and coupling the cutter members with one another without slip, each of said cutter members having a cutter support and at least one cutter secured to the periphery of the cutter support, while the cutters of the two cutter members are relatively arranged in off-set fashion and the cutter paths of the two cutter members overlap one another, characterized in that a motor is arranged beneath the cutter support of at least one of the cutter members, said motor communicating through a duct system with the driving means arranged on the vehicle to produce energy like an aggregate, each driving shaft of the motor being hollow and the housing being suspended from the vehicle by means of a supporting bar extending through the hollow shaft.

2. A mowing implement to be attached to a vehicle having auxiliary drive means, comprising:
   a housing extending substantially at right angles to the direction of travel of the vehicle, said housing having an elongate rectangular configuration and being provided at one end with means for attachment to a vehicle;
   a plurality of rotatable shafts extending vertically through said housing each presenting a lower end within said housing, said shafts being disposed along the longitudinal axis of said housing in pairwise fashion and being in predetermined spaced relation from each other, each shaft with the exception of that disposed at the other end of said housing having its upper end extending slightly above said housing and said one shaft having its upper end extending above said housing a greater distance than the remaining shafts;
   gear means accommodated within said housing for drivingly engaging said lower end of each of said shafts in such fashion that each pair of shafts rotate in opposite directions;
   a plurality of substantially flat, disc-like cutter supports, each being attached at its center to the upper end a respective one of said remaining shafts, said cutter supports being substantially coplanar and closely spaced above said housing and each projecting forwardly from said housing;
   a hood-like cutter support attached at its center to the upper end of said one shaft, said hood-like support presenting a central region providing a clearance space in surrounding relation to said upper end of the one shaft, and also presenting a peripheral margin which is substantially coplanar with said disc-like supports;
   a plurality of cutters at least one of which is attached to the periphery of each cutter support to extend radially outwardly therefrom such that each cutter sweeps a cutting path which overlaps the cutting paths of the cutter of an adjacent cutter support, said others being circumferentially staggered on said supports;
   a motor disposed within said clearance space beneath said hood-like cutter support and drivingly secured to the upper end of said one shaft for imparting rotation thereto, the rotation of said shaft rotatably driving said gear means thereby to impart rotation simultaneously to all of said shafts;
   means connecting said motor with said auxiliary drive means on the vehicle for imparting drive to said motor.

3. A mowing implement as claimed in claim 2, wherein at least four cutter members are all intercoupled by means of the driving gear.

4. A mowing implement as claimed in claim 2, wherein beneath the hood-like cutter support a space is formed between motor and each fastening member for a cutter, said space allowing a free rotation of the cutter about the fastening member.

5. A mowing implement as defined in claim 2 wherein said motor is a hydraulic motor and the means last mentioned comprises a duct system for supplying hydraulic fluid to said motor and returning it therefrom.

6. A mowing implement as defined in claim 2 wherein said central region of said hood-like cutter support is in the form of a truncated cone.

7. A mowing implement as claimed in claim 5, wherein the duct system includes a switching member switching off the motor in the event of overload.

8. A mowing implement as defined in claim 6 wherein said central region of said hood-like cutter support is in the form of a hollow cylinder.

* * * * *